United States Patent
Liu et al.

(10) Patent No.: US 11,424,888 B2
(45) Date of Patent: Aug. 23, 2022

(54) DEMODULATION REFERENCE SIGNAL CONFIGURATION

(71) Applicant: Motorola Mobility LLC, Chicago, IL (US)

(72) Inventors: Hongmei Liu, Beijing (CN); Chenxi Zhu, Beijing (CN); Zhennian Sun, Beijing (CN); Haiming Wang, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/626,289

(22) PCT Filed: Jun. 26, 2017

(86) PCT No.: PCT/CN2017/090042
§ 371 (c)(1),
(2) Date: Dec. 23, 2019

(87) PCT Pub. No.: WO2019/000182
PCT Pub. Date: Jan. 3, 2019

(65) Prior Publication Data
US 2020/0119880 A1    Apr. 16, 2020

(51) Int. Cl.
*H04L 5/00* (2006.01)
*H04W 72/04* (2009.01)

(52) U.S. Cl.
CPC .................................. *H04L 5/0051* (2013.01)

(58) Field of Classification Search
None
See application file for complete search history.

(56) References Cited

U.S. PATENT DOCUMENTS

| | | | | |
|---|---|---|---|---|
| 2012/0250642 A1* | 10/2012 | Qu | .......... | H04W 48/12 370/329 |
| 2014/0112287 A1* | 4/2014 | Chun | .......... | H04L 5/0048 370/329 |
| 2014/0112290 A1* | 4/2014 | Chun | .......... | H04L 5/0053 370/329 |

(Continued)

FOREIGN PATENT DOCUMENTS

| | | |
|---|---|---|
| CN | 103259635 A | 8/2013 |
| WO | 2014149062 A1 | 9/2014 |
| WO | 2017050153 A1 | 3/2017 |

OTHER PUBLICATIONS

PCT/CN2017/090042, Notification of Transmittal of the International Search Report and the Written Opinion of the International Searching Authority, or the Declaration, dated Mar. 15, 2018, pp. 1-9.

(Continued)

*Primary Examiner* — Duc T Duong
(74) *Attorney, Agent, or Firm* — Kunzler Bean & Adamson (57) ABSTRACT

Apparatuses, methods, and systems are disclosed for demodulation reference signal configuration. One apparatus (200) includes a receiver (212) configured to receive (502) a demodulation reference signal configuration for a physical downlink shared channel. The apparatus (200) also includes the receiver (212) configured to receive (504) a demodulation reference signal based on the demodulation reference signal configuration.

20 Claims, 6 Drawing Sheets

(56) References Cited

U.S. PATENT DOCUMENTS

| | | | | |
|---|---|---|---|---|
| 2014/0321421 | A1* | 10/2014 | Popovic | H04L 5/0048 370/330 |
| 2015/0181572 | A1* | 6/2015 | Guo | H04W 4/06 370/312 |
| 2015/0236801 | A1* | 8/2015 | Sun | H04L 27/2613 370/328 |
| 2015/0282124 | A1* | 10/2015 | Miao | H04W 72/042 455/450 |
| 2016/0087774 | A1* | 3/2016 | Guo | H04L 5/0051 370/329 |
| 2017/0230979 | A1* | 8/2017 | Saxena | H04L 5/0044 |
| 2017/0230994 | A1* | 8/2017 | You | H04L 5/0053 |
| 2017/0272141 | A1* | 9/2017 | Horiuchi | H04L 5/0033 |
| 2017/0366377 | A1* | 12/2017 | Papasakellariou | H04L 27/2613 |
| 2018/0279193 | A1* | 9/2018 | Park | H04W 36/08 |
| 2018/0359067 | A1* | 12/2018 | Kim | H04W 72/0446 |
| 2019/0261329 | A1* | 8/2019 | Park | H04L 5/0048 |
| 2020/0128498 | A1* | 4/2020 | Harada | H04L 27/2649 |
| 2021/0105113 | A1* | 4/2021 | Saito | H04W 72/04 |
| 2021/0153171 | A1* | 5/2021 | Saito | H04L 5/0048 |

OTHER PUBLICATIONS

Sharp, "DCI signalling in DCI format 2D and fallback operation in TM10", 3GPP TSG RAN WG1 Meeting #71 R1-125142, Nov. 12-16, 2012, pp. 1-9.

Sharp, "PDSCH starting symbol and PDSCH RE mapping", 3GPP TSG RAN WG1 Meeting #72 R1-130529, Jan. 28-Feb. 1, 2013, pp. 1-2.

* cited by examiner

DEMODULATION REFERENCE SIGNAL CONFIGURATION

FIELD

The subject matter disclosed herein relates generally to wireless communications and more particularly relates to demodulation reference signal configuration.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a PDSCH demodulation reference signal ("DMRS") may be used. In such networks, multiple different PDSCH DMRS configurations may be possible.

BRIEF SUMMARY

Apparatuses for demodulation reference signal configuration are disclosed. Methods and systems also perform the functions of the apparatus. In one embodiment, the apparatus includes a receiver that: receives a demodulation reference signal configuration for a physical downlink shared channel; and receives a demodulation reference signal based on the demodulation reference signal configuration.

In one embodiment, the demodulation reference signal configuration includes a separate configuration for the physical downlink shared channel and the separate configuration is different from that of a physical downlink control channel. In a further embodiment, the demodulation reference signal configuration is shared between the physical downlink shared channel and a physical downlink control channel. In certain embodiments, the demodulation reference signal configuration includes a frequency domain configuration, a time domain configuration, a demodulation reference signal port mapping order, or some combination thereof. In various embodiments, the frequency domain configuration includes a periodicity, an offset, or some combination thereof. In some embodiments, the periodicity, the offset, or some combination thereof corresponds to a physical resource block. In one embodiment, the periodicity, the offset, or some combination thereof is indicated by radio resource control signaling. In a further embodiment, the time domain configuration includes a subframe level configuration, a symbol level configuration, or some combination thereof. In certain embodiments, the subframe level configuration includes a periodicity, an offset, or some combination thereof.

In various embodiments, the periodicity indicates whether a demodulation reference signal is present in a single subframe. In some embodiments, the periodicity, the offset, or some combination thereof indicates a demodulation reference signal bearing subframe for continuously scheduled subframes. In one embodiment, the periodicity, the offset, or some combination thereof indicates a demodulation reference signal bearing subframe for non-continuously scheduled subframes. In a further embodiment, the demodulation reference signal bearing subframe for non-continuously scheduled subframes is based on blank subframes being counted. In certain embodiments, the demodulation reference signal bearing subframe for non-continuously scheduled subframes is based on blank subframes not being counted. In various embodiments, the periodicity, the offset, or some combination thereof is indicated by radio resource control signaling. In some embodiments, the symbol level configuration includes one or more symbols in a subframe or slot. In one embodiment, the symbol level configuration is indicated by downlink control information signaling, radio resource control signaling, or some combination thereof.

In certain embodiments, the demodulation reference signal port mapping order includes a first mapping comprising frequency division multiplexing, a second mapping comprising frequency division orthogonal cover codes, and a third mapping comprising time division orthogonal cover codes, and wherein the first mapping, the second mapping, and the third mapping are performed in any suitable order. In various embodiments, the demodulation reference signal port mapping order includes a first mapping comprising frequency division multiplexing, a second mapping comprising frequency division orthogonal cover codes, and a third mapping comprising time division multiplexing, and wherein the first mapping, the second mapping, and the third mapping are performed in any suitable order. In some embodiments, the demodulation reference signal port mapping order includes a first mapping comprising cyclic shift, a second mapping comprising comb, and a third mapping comprising time division orthogonal cover codes, and wherein the first mapping, the second mapping, and the third mapping are performed in any suitable order. In one embodiment, the demodulation reference signal port mapping order includes a first mapping comprising cyclic shift, a second mapping comprising comb, and a third mapping comprising time division multiplexing, and wherein the first mapping, the second mapping, and the third mapping are performed in any suitable order.

In certain embodiments, the demodulation reference signal sharing between the physical downlink shared channel and the physical downlink control channel is indicated by radio resource control signaling, downlink control signaling, or some combination thereof. In some embodiments, the demodulation reference signal configuration is per a bandwidth part.

A method for demodulation reference signal configuration, in one embodiment, includes receiving a demodulation reference signal configuration for a physical downlink shared channel. In some embodiments, the method includes receiving a demodulation reference signal based on the demodulation reference signal configuration.

In one embodiment, an apparatus for demodulation reference signal configuration includes a transmitter that: transmits a demodulation reference signal configuration for a physical downlink shared channel; and transmits a demodulation reference signal based on the demodulation reference signal configuration.

In one embodiment, the demodulation reference signal configuration includes a separate configuration for the physical downlink shared channel and a physical downlink control channel. In a further embodiment, the demodulation reference signal configuration is shared between the physical downlink shared channel and a physical downlink control channel. In certain embodiments, the demodulation reference signal configuration includes a frequency domain configuration, a time domain configuration, a demodulation reference signal port mapping order, or some combination thereof. In various embodiments, the frequency domain configuration includes a periodicity, an offset, or some combination thereof. In some embodiments, the periodicity, the offset, or some combination thereof corresponds to a physical resource block. In one embodiment, the periodicity, the offset, or some combination thereof is indicated by radio resource control signaling. In a further embodiment, the time domain configuration includes a subframe level configuration, a symbol level configuration, or some combination thereof. In certain embodiments, the subframe level configuration includes a periodicity, an offset, or some combination thereof.

In various embodiments, the periodicity indicates whether a demodulation reference signal is present in a single subframe. In some embodiments, the periodicity, the offset, or some combination thereof indicates a demodulation reference signal bearing subframe for continuously scheduled subframes. In one embodiment, the periodicity, the offset, or some combination thereof indicates a demodulation reference signal bearing subframe for non-continuously scheduled subframes. In a further embodiment, the demodulation reference signal bearing subframe for non-continuously scheduled subframes is based on blank subframes being counted. In certain embodiments, the demodulation reference signal bearing subframe for non-continuously scheduled subframes is based on blank subframes not being counted. In various embodiments, the periodicity, the offset, or some combination thereof is indicated by radio resource control signaling. In some embodiments, the symbol level configuration includes one or more symbols in a subframe or slot. In one embodiment, the symbol level configuration is indicated by downlink control information signaling, radio resource control signaling, or some combination thereof.

In certain embodiments, the demodulation reference signal port mapping order includes a first mapping comprising frequency division multiplexing, a second mapping comprising frequency division orthogonal cover codes, and a third mapping comprising time division orthogonal cover codes, and wherein the first mapping, the second mapping, and the third mapping are performed in any suitable order. In various embodiments, the demodulation reference signal port mapping order includes a first mapping comprising frequency division multiplexing, a second mapping comprising frequency division orthogonal cover codes, and a third mapping comprising time division multiplexing, and wherein the first mapping, the second mapping, and the third mapping are performed in any suitable order. In some embodiments, the demodulation reference signal port mapping order includes a first mapping comprising cyclic shift, a second mapping comprising comb, and a third mapping comprising time division orthogonal cover codes, and wherein the first mapping, the second mapping, and the third mapping are performed in any suitable order. In one embodiment, the demodulation reference signal port mapping order includes a first mapping comprising cyclic shift, a second mapping comprising comb, and a third mapping comprising time division multiplexing, and wherein the first mapping, the second mapping, and the third mapping are performed in any suitable order.

In certain embodiments, the demodulation reference signal sharing between the physical downlink shared channel and the physical downlink control channel is indicated by radio resource control signaling, downlink control signaling, or some combination thereof. In some embodiments, the demodulation reference signal configuration is per a bandwidth part.

A method for demodulation reference signal configuration, in one embodiment, includes transmitting a demodulation reference signal configuration for a physical downlink shared channel. The method, in certain embodiments, includes transmitting a demodulation reference signal based on the demodulation reference signal configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
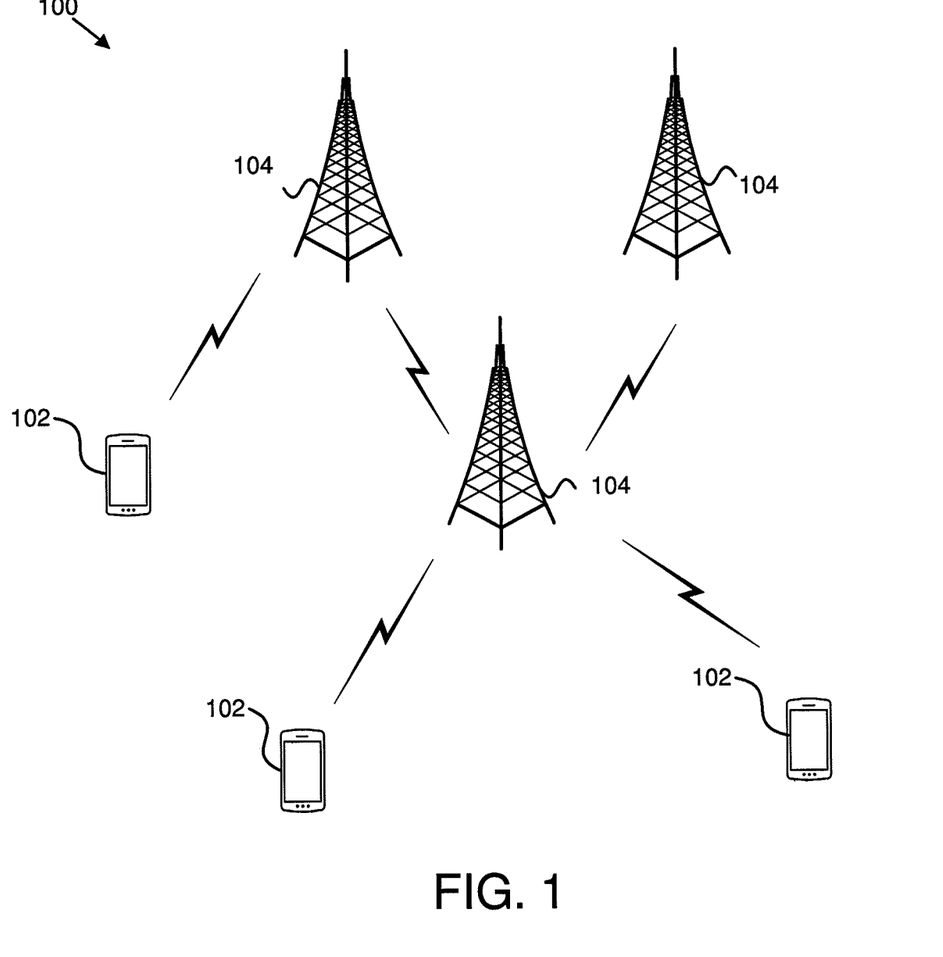
FIG. 1 is a schematic block diagram illustrating one embodiment of a wireless communication system for demodulation reference signal configuration.

FIG. 1 depicts an embodiment of a wireless communication system 100 for demodulation reference signal configuration. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive a demodulation reference signal configuration for a physical downlink shared channel. In some embodiments, the remote unit 102 may receive a demodulation reference signal based on the demodulation reference signal configuration. Accordingly, a remote unit 102 may be used for demodulation reference signal configuration.

In certain embodiments, a base unit 104 may transmit a demodulation reference signal configuration for a physical downlink shared channel. The base unit 104, in certain embodiments, may transmit a demodulation reference signal based on the demodulation reference signal configuration. Accordingly, a base unit 104 may be used for demodulation reference signal configuration.

Figure 2:
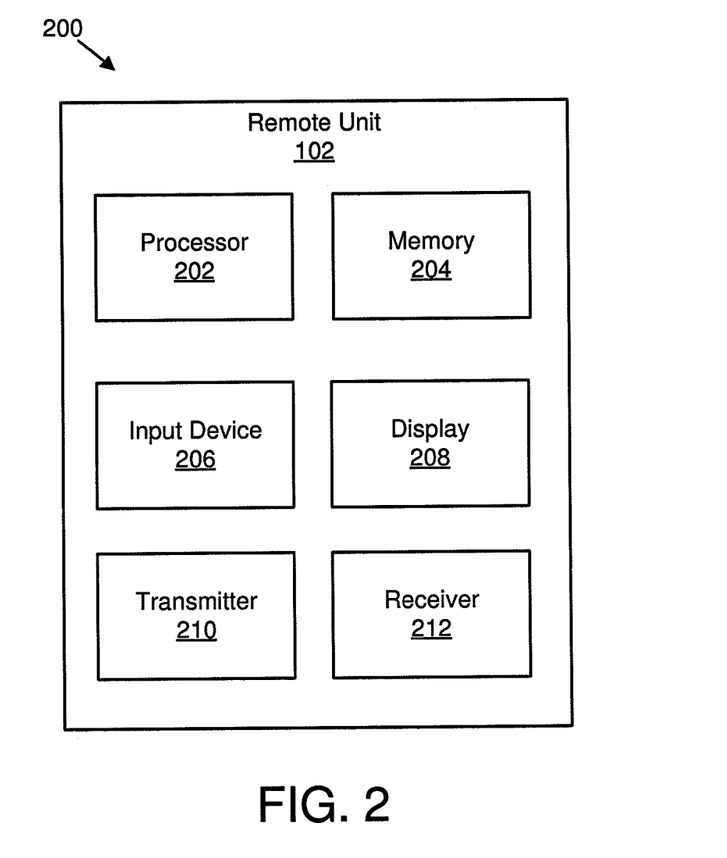
FIG. 2 is a schematic block diagram illustrating one embodiment of an apparatus that may be used for demodulation reference signal configuration.

FIG. 2 depicts one embodiment of an apparatus 200 that may be used for demodulation reference signal configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to DMRS configurations. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 may be used to receive a demodulation reference signal configuration for a physical downlink shared channel. In various embodiments, the receiver 212 may be used to receive a demodulation reference signal based on the demodulation reference signal configuration. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
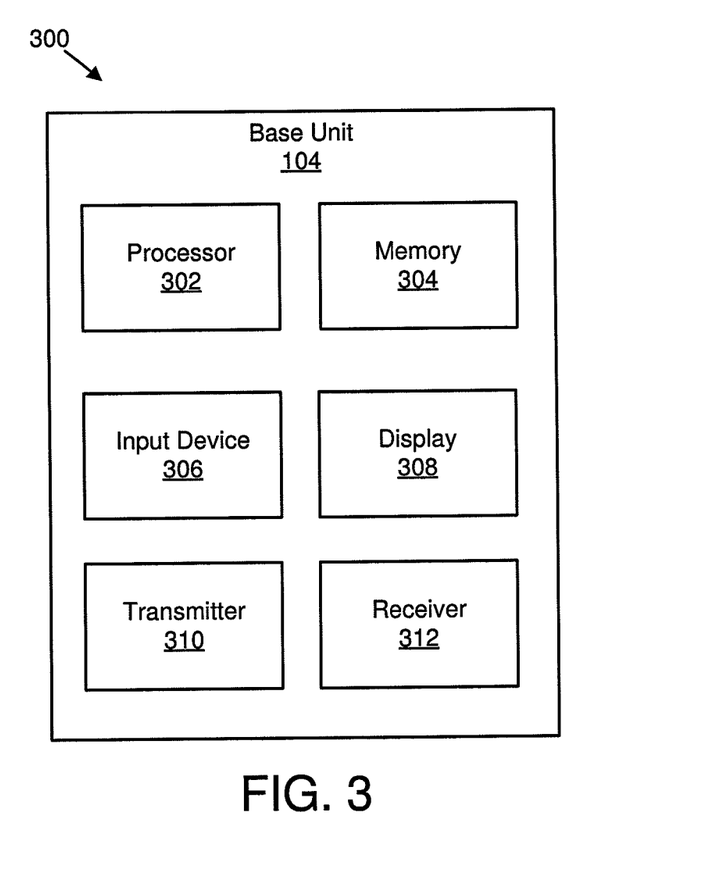
FIG. 3 is a schematic block diagram illustrating one embodiment of an apparatus that may be used for demodulation reference signal configuration.

FIG. 3 depicts one embodiment of an apparatus 300 that may be used for demodulation reference signal configuration. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit a demodulation reference signal configuration for a physical downlink shared channel. In various embodiments, the transmitter 310 may transmit a demodulation reference signal based on the demodulation reference signal configuration. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Various PDSCH DMRS embodiments may have a front-loaded DMRS. In a first front loaded PDSCH DMRS embodiment, up to 8 ports may be supported. Such embodiments may have an interleaved frequency division multiplexing ("IFDM") based pattern with comb 2 and/or comb 4 with cyclic shifts ("CS"). In certain embodiments, the first front loaded PDSCH DMRS configuration may have one OFDM symbol. The one OFDM symbol may, in various configurations, be comb 2 plus 2 CS for up to 4 ports. In other embodiments, the one OFDM symbol may be comb 4 plus 2 CS for up to 8 ports. In various embodiments, the first front loaded PDSCH DMRS configuration may have two OFDM symbols. The two OFDM symbols may, in some configurations, be selected from: comb 2 plus 2 CS plus TD-OCC of ({1 1} and {1 −1}) for up to 8 ports; comb 2 plus 4 CS plus TD-OCC ({1 1}) for up to 8 ports; and comb 4 plus 2 CS plus TD-OCC ({1 1}) for up to 8 ports. As used herein, "symbol" may refer to OFDM symbol and "symbol level" may refer to an OFDM symbol level.

In a second front loaded PDSCH DMRS embodiment, up to 12 ports may be supported. Such embodiments may have an FD-OCC based pattern with adjacent REs in the frequency domain. In certain embodiments, the second front loaded PDSCH DMRS configuration may have one OFDM symbol. The one OFDM symbol may, in various configurations, be selected from: 2 FD-OCC across adjacent REs in the frequency domain for up to 6 ports; 2 FD-OCC across adjacent REs in the frequency domain for up to 4 ports; and 2 FD-OCC across adjacent REs in the frequency domain for up to 2 ports. In various embodiments, the second front loaded PDSCH DMRS configuration may have two OFDM symbols. The two OFDM symbols may, in some configurations, be selected from: 2 FD-OCC across adjacent REs in the frequency domain plus TDM for up to 12 ports; and 2 FD-OCC across adjacent REs in the frequency domain plus TD-OCC ({1 1} and {1−1}) for up to 12 ports.

Figure 4:
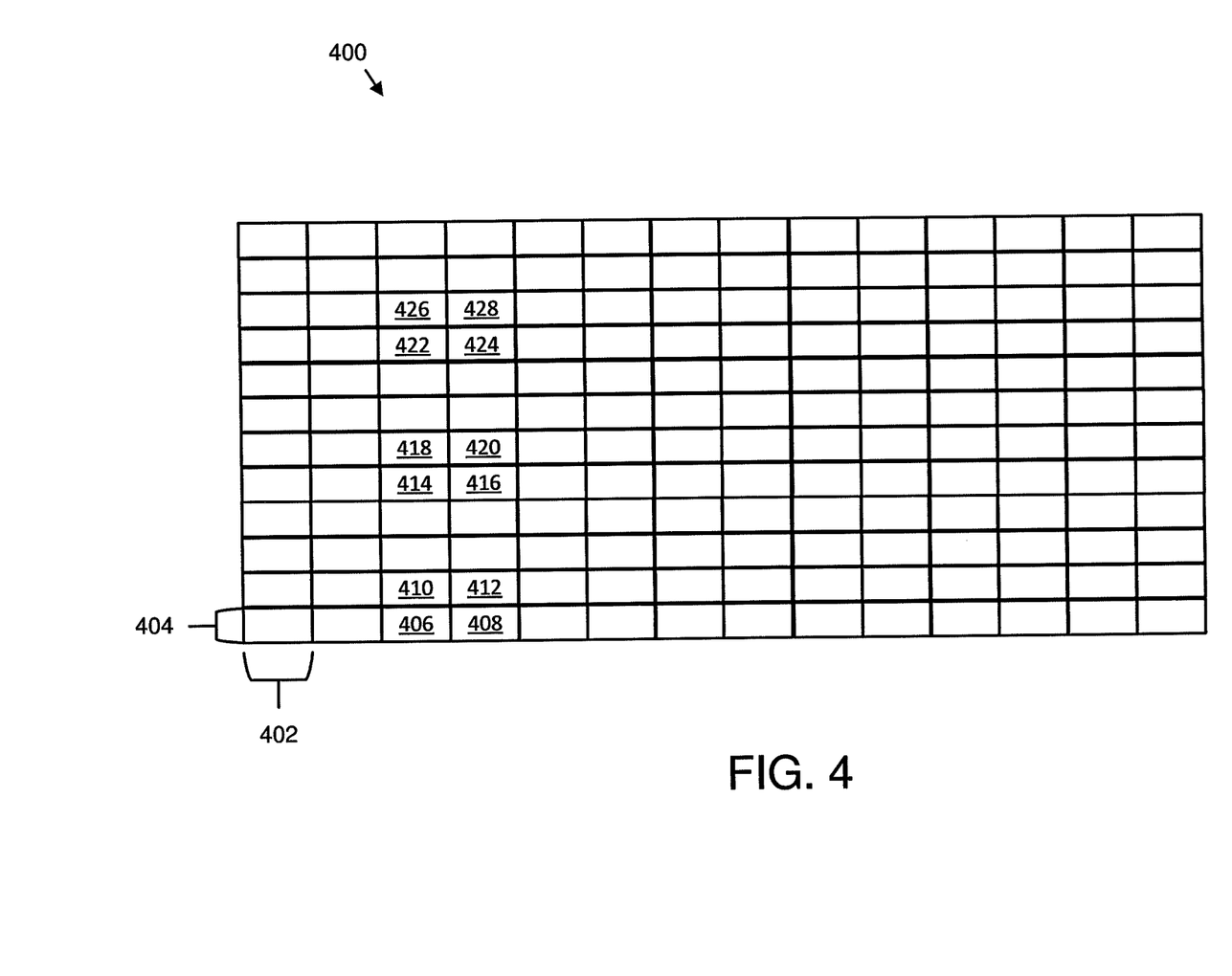
FIG. 4 is a schematic block diagram illustrating one embodiment of a PRB.

FIG. 4 is a schematic block diagram illustrating one embodiment of a PRB 400. The PRB 400 includes 14 symbols 402 and 12 subcarriers 404. The third and fourth symbols 402 include REs 406, 408, 410, 412, 414, 416, 418, 420, 422, 424, 426, and 428.

FIG. 4 is used to illustrate REs that may be used for DMRS port to RE mapping. In various embodiments, DMRS port to RE mapping may be based on frequency division multiplexing ("FDM"), frequency division orthogonal cover codes ("FD-OCC"), time division orthogonal cover codes ("TD-OCC"), time division multiplexing ("TDM"), cyclic shift ("CS"), and/or comb.

In one embodiment, the REs 406 through 428 may be determined by an RE mapping order of TD-OCC followed by FD-OCC followed by FDM. Such an embodiment may result in: REs 406, 408, 410, and 412 using TD-OCC followed by FD-OCC mapped to ports 0, 1, 2, and 3; REs 414, 416, 418, and 420 using TD-OCC followed by FD-OCC mapped to ports 4, 5, 6, and 7; and REs 422, 424, 426, and 428 using TD-OCC followed by FD-OCC mapped to ports 8, 9, 10, and 11. In certain embodiments, the OCC sequences for ports 0 through 3 may be as follows: for port 0 (+1, +1, +1, +1); for port 1 (+1, −1, +1, −1); for port 2 (+1, +1, −1, −1); and for port 3 (+1, −1, −1, +1). In various embodiments, the OCC sequences for ports 4 through 7 and for ports 8 through 11 may match the OCC sequences for ports 0 through 3.

In another embodiment, the REs 406 through 428 may be determined by an RE mapping order of FD-OCC followed by TD-OCC followed by FDM. Such an embodiment may result in: REs 406, 408, 410, and 412 using FD-OCC followed by TD-OCC mapped to ports 0, 1, 2, and 3; REs 414, 416, 418, and 420 using FD-OCC followed by TD-OCC mapped to ports 4, 5, 6, and 7; and REs 422, 424, 426, and 428 using FD-OCC followed by TD-OCC mapped to ports 8, 9, 10, and 11.

In a further embodiment, the REs 406 through 428 may be determined by an RE mapping order of FDM followed by TD-OCC followed by FD-OCC. Such an embodiment may result in: REs 406, 408, 410, and 412 using TD-OCC followed by FD-OCC mapped to ports 0, 3, 6, and 9; REs 414, 416, 418, and 420 using TD-OCC followed by FD-OCC mapped to ports 1, 4, 7, and 10; and REs 422, 424, 426, and 428 using TD-OCC followed by FD-OCC mapped to ports 2, 5, 8, and 11.

In certain embodiments, the REs 406 through 428 may be determined by an RE mapping order of FDM followed by FD-OCC followed by TD-OCC. Such an embodiment may result in: REs 406, 408, 410, and 412 using FD-OCC followed by TD-OCC mapped to ports 0, 3, 6, and 9; REs 414, 416, 418, and 420 using FD-OCC followed by TD-OCC mapped to ports 1, 4, 7, and 10; and REs 422, 424, 426, and 428 using FD-OCC followed by TD-OCC mapped to ports 2, 5, 8, and 11.

In various embodiments, the REs 406 through 428 may be determined by an RE mapping order of TD-OCC followed by FDM followed by FD-OCC. Such an embodiment may result in: REs 406, 408, 410, and 412 using TD-OCC followed by FD-OCC mapped to ports 0, 1, 6, and 7; REs 414, 416, 418, and 420 using TD-OCC followed by FD-OCC mapped to ports 2, 3, 8, and 9; and REs 422, 424, 426, and 428 using TD-OCC followed by FD-OCC mapped to ports 4, 5, 10, and 11.

In some embodiments, the REs 406 through 428 may be determined by an RE mapping order of FD-OCC followed by FDM followed by TD-OCC. Such an embodiment may result in: REs 406, 408, 410, and 412 using FD-OCC followed by TD-OCC mapped to ports 0, 1, 6, and 7; REs 414, 416, 418, and 420 using FD-OCC followed by TD-OCC mapped to ports 2, 3, 8, and 9; and REs 422, 424, 426, and 428 using FD-OCC followed by TD-OCC mapped to ports 4, 5, 10, and 11. In such embodiments, Table 1 may be used as a DMRS table used to indicate used ports to each remote unit 102.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 0-1, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |

TABLE 1-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 4 | 1 layer, port 0, $n_{SCID} = 0$ (OCC = 4) | 4 | 2 layer, port 6, 7, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 1, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 6, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 7, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In one embodiment, the REs 406 through 428 may be determined by an RE mapping order of FD-OCC followed by TDM followed by FDM. Such an embodiment may result in: REs 406 and 410 using FD-OCC mapped to ports 0 and 1; REs 408 and 412 using FD-OCC mapped to ports 2 and 3; REs 414 and 418 FD-OCC mapped to ports 4 and 5; REs 416 and 420 FD-OCC mapped to ports 6 and 7; REs 422 and 426 FD-OCC mapped to ports 8 and 9; and REs 424 and 428 FD-OCC mapped to ports 10 and 11. In certain embodiments, the OCC sequences for ports 0 and 1 may be as follows: for port 0 (+1, +1); and for port 1 (+1, −1). In various embodiments, the OCC sequences for ports 2 and 3, ports 4 and 5, ports 6 and 7, ports 8 and 9, and ports 10 and 11 may match the OCC sequences for ports 0 and 1.

In another embodiment, the REs 406 through 428 may be determined by an RE mapping order of FD-OCC followed by FDM followed by TDM. Such an embodiment may result in: REs 406 and 410 using FD-OCC mapped to ports 0 and 1; REs 408 and 412 using FD-OCC mapped to ports 6 and 7; REs 414 and 418 FD-OCC mapped to ports 2 and 3; REs 416 and 420 FD-OCC mapped to ports 8 and 9; REs 422 and 426 FD-OCC mapped to ports 4 and 5; and REs 424 and 428 FD-OCC mapped to ports 10 and 11.

In a further embodiment, the REs 406 through 428 may be determined by an RE mapping order of TDM followed by FD-OCC followed by FDM. Such an embodiment may result in: REs 406 and 410 using FD-OCC mapped to ports 0 and 2; REs 408 and 412 using FD-OCC mapped to ports 1 and 3; REs 414 and 418 FD-OCC mapped to ports 4 and 6; REs 416 and 420 FD-OCC mapped to ports 5 and 7; REs 422 and 426 FD-OCC mapped to ports 8 and 10; and REs 424 and 428 FD-OCC mapped to ports 9 and 11. In certain embodiments, the OCC sequences for ports 0 and 2 may be as follows: for port 0 (+1, +1); and for port 2 (+1, −1). In various embodiments, the OCC sequences for any adjacent subcarriers may match the OCC sequences for ports 0 and 2 (e.g., ports 1 and 3, ports 4 and 6, ports 5 and 7, ports 8 and 10, and ports 9 and 11).

In certain embodiments, the REs 406 through 428 may be determined by an RE mapping order of FDM followed by FD-OCC followed by TDM. Such an embodiment may result in: REs 406 and 410 using FD-OCC mapped to ports 0 and 3; REs 408 and 412 using FD-OCC mapped to ports 6 and 9; REs 414 and 418 FD-OCC mapped to ports 1 and 4; REs 416 and 420 FD-OCC mapped to ports 7 and 10; REs 422 and 426 FD-OCC mapped to ports 2 and 5; and REs 424 and 428 FD-OCC mapped to ports 8 and 11. In various embodiments, the OCC sequences for any adjacent subcarriers may match the OCC sequences for ports 0 and 2 set forth above.

In various embodiments, the REs 406 through 428 may be determined by an RE mapping order of FDM followed by TDM followed by FD-OCC. Such an embodiment may result in: REs 406 and 410 using FD-OCC mapped to ports 0 and 6; REs 408 and 412 using FD-QCC mapped to ports 3 and 9; REs 414 and 418 FD-OCC mapped to ports 1 and 7; REs 416 and 420 FD-OCC mapped to ports 4 and 10; REs 422 and 426 FD-OCC mapped to ports 2 and 8; and REs 424 and 428 FD-OCC mapped to ports 5 and 11. In certain embodiments, the OCC sequences for any adjacent subcarriers may match the OCC sequences for ports 0 and 2 set forth above.

In some embodiments, the REs 406 through 428 may be determined by an RE mapping order of TDM followed by FDM followed by FD-OCC. Such an embodiment may result in: REs 406 and 410 using FD-OCC mapped to ports 0 and 6; REs 408 and 412 using FD-OCC mapped to ports 1 and 7; REs 414 and 418 FD-OCC mapped to ports 2 and 8; REs 416 and 420 FD-OCC mapped to ports 3 and 9; REs 422 and 426 FD-OCC mapped to ports 4 and 10; and REs 424 and 428 FD-OCC mapped to ports 5 and 11. In certain embodiments, the OCC sequences for any adjacent subcarriers may match the OCC sequences for ports 0 and 2 set forth above.

Various embodiments set forth above use 12 ports. As may be appreciated, for DMRS with 2, 4, or 8 ports, similar embodiments may be used. Moreover, the various embodiments set forth above may be used to support DL, UL, transparent, and/or non-transparent multi user ("MU") MIMO.

In some embodiments, the signaling of DMRS may be expressed in a frequency domain and/or a time domain. In various embodiments, the signaling of DMRS may be bandwidth part specific. In certain embodiments, to reduce DMRS overhead in a frequency domain, only part of a scheduled PRBs may have DMRS consumption. In one embodiment, the indication of DMRS bearing PRB may be expressed by periodicity and/or offset. In some embodiments, the unit may be per PRB and this may be configured by RRC signaling. In various embodiments, for time domain DMRS density, it may be divided at a subframe level and/or a symbol level.

In certain embodiments, subframe level DMRS density configuration may be used for overhead reduction in a time domain. For a single remote unit 102, there may be three scheduling cases: a single subframe scheduled; continuous multiple subframes scheduled; and non-continuous multiple subframes scheduled.

In some embodiments, for a single subframe scheduling case, DMRS for a remote unit 102 may be present or non-present depending on a channel variation in a time domain and depending on whether channel estimation is available for nearby scheduled subframes.

In various embodiments, for a multiple subframe scheduling case that is either continuous or discontinuous, overhead reduction may be achieved by placing only DMRS in part of the scheduled subframes. In certain embodiments, a common framework of subframe level periodicity and/or offset may be used. In one embodiment, two special periodicity values may be used to indicate DMRS presence and non-presence. In another embodiment, periodicity and/or offset may be used to indicate a DMRS bearing subframe with respect to a first scheduled subframe. In a further embodiment, subframes used to calculate periodicity and/or offset may contain both scheduled subframes and blank subframes. In various embodiments, subframes used to calculate periodicity and/or offset may contain only scheduled subframes. In certain embodiments, time domain periodicity and/or offset may be configured separately. In some embodiments, periodicity may be semi-statically configured, and an offset may be implicitly obtained by a first scheduled subframe. For example, if a periodicity is set to be 10 ms and a first scheduled subframe index is 1, then a corresponding DMRS offset may be 1. In various embodiments, a time domain periodicity and/or offset configuration may be performed by RRC signaling.

In certain embodiments, there may be two kinds of DMRS: front loaded DMRS, and additional DMRS. In some embodiments, front loaded DMRS position may be set to symbols 2 and 3, and may be a main DMRS in a subframe or slot. In various embodiments, additional DMRS may be used for high speed scenarios to provide more accurate channel estimation. In certain embodiments, the additional DMRS positions may be symbols 6 and 7 or symbols 11 and 12. In other embodiments, the additional DMRS positions may be any suitable symbols.

In various embodiments, additional DMRS plus front loaded DMRS may both be configured for high speed scenario, while for slow moving scenario, only front loaded DMRS may be used. In some embodiments, to support flexible DMRS symbol occupation, the front loaded and additional DMRS symbols may be indexed as 0, 1, 2, 3, where 0/1 means the two front loaded DMRS symbols, and 2/3 means the two additional DMRS symbols. In such embodiments, the possible DMRS occupation combinations may be: {0}, {0, 1}, {0, 2}, {0, 1, 2}, {0, 1, 2, 3}. In one embodiment, a 1-symbol frontloaded DMRS and a 1-symbol additional DMRS may be for a high speed scenario with less multiplexing spatial layers. With the prior described embodiments, 3 bits may be used to signal the DMRS combination. In some embodiments, the 3 bits may be indicated by DCI and/or RRC signaling.

In some embodiments, mini-slot DMRS may reuse normal subframe DMRS as much as possible. In certain embodiments, a mini-slot may be divided in two ways: a mini-slot length equal to or larger than Y; and a mini-slot length shorter than Y. In such embodiments, Y may be a predefined value (e.g., Y=7).

For a mini-slot length equal to or larger than Y, a normal subframe DMRS may be reused with possible shifting. In certain embodiments, in response to the mini-slot starting symbol not being aligned with a normal subframe starting symbol, shifting may be used. For example, in response to the mini-slot starting from symbol 2, and occupies 12 symbols, a frontloaded mini-slot DMRS symbol may occupy symbols 4 and 5, which is a 2-symbol shift relative to symbol 2 and 3 in a normal subframe.

For a mini-slot length shorter than Y, there may be two alternatives to reduce DMRS overhead: PDSCH DMRS occupying one symbol, and the symbol being located next to a PDCCH ending symbol; and PDSCH sharing a same DMRS as PDCCH.

For PDSCH DMRS occupying one symbol, a DMRS pattern with 1-symbol occupation may be used. This facilitates flexibility due to PDSCH specific DMRS. The maximum mini-slot DMRS port number and the DCI for scheduling the mini-slot may be separately designed from normal subframe DMRS/DCI. The mini-slot DMRS port number may be restricted to a small number, such as 4, to reduce the DMRS overhead. Meanwhile, DCI for mini-slot may take overhead consumption into account. The DCI for scheduling a mini-slot may be a compact DCI, with small DMRS port number (maximum 4), small codeword number (1 CW), and other overhead reduction methods. The mini-slot duration may be limited to a small set for a specific usage scenario. The set may be semi-statically configured, and DCI may be used to indicate which duration is actually used from the set for a mini-slot scheduling.

For PDSCH sharing a same DMRS as PDCCH, restriction for PDSCH transmission may be unavoidable. In some embodiments, PDCCH DMRS may support at most 2 ports, therefore PDSCH spatial layers may be limited to 2. The DMRS sharing of PDCCH and PDSCH may be a partial share. The PDSCH DMRS port number may be larger than PDCCH DMRS, and PDSCH ports 0 and 1 may be shared with PDCCH. Sharing may mean that a same RE mapping, a same DMRS port indexing, and/or a same precoding vector selection. PDCCH and PDSCH may have different block error ratio ("BLER") requirements for a single transmission, and may limit a spectrum efficiency of PDSCH transmission. In certain embodiments, DCI and/or RRC signaling may be used to indicate whether PDSCH DMRS occupying one symbol or PDSCH sharing a same DMRS as PDCCH is used for a mini-slot.

Figure 5:
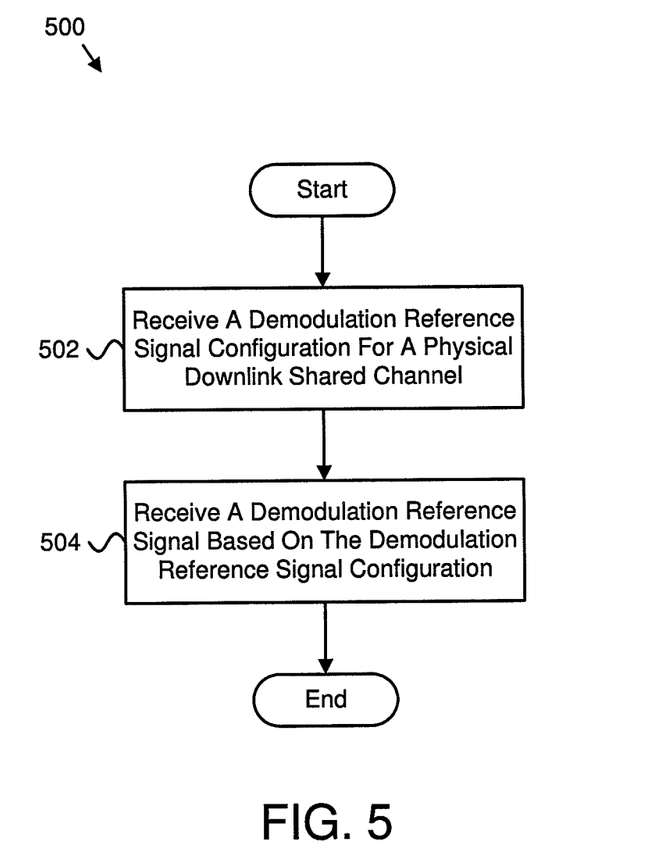
FIG. 5 is a schematic flow chart diagram illustrating one embodiment of a method for demodulation reference signal configuration.

FIG. 5 is a schematic flow chart diagram illustrating one embodiment of a method 500 for demodulation reference signal configuration. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 a demodulation reference signal configuration for a physical downlink shared channel. In some embodiments, the method 500 includes receiving 504 a demodulation reference signal based on the demodulation reference signal configuration.

In one embodiment, the demodulation reference signal configuration includes a separate configuration for the physical downlink shared channel and the separate configuration is different from that of a physical downlink control channel. In a further embodiment, the demodulation reference signal configuration is shared between the physical downlink shared channel and a physical downlink control channel. In certain embodiments, the demodulation reference signal configuration includes a frequency domain configuration, a time domain configuration, and/or a demodulation reference signal port mapping order. In various embodiments, the frequency domain configuration includes a periodicity, and/ or an offset. In some embodiments, the periodicity and/or the offset corresponds to a physical resource block. In one embodiment, the periodicity and/or the offset is indicated by radio resource control signaling. In a further embodiment, the time domain configuration includes a subframe level configuration, and/or a symbol level configuration. In certain embodiments, the subframe level configuration includes a periodicity and/or an offset.

In various embodiments, the periodicity indicates whether a demodulation reference signal is present in a single subframe. In some embodiments, the periodicity and/or the offset indicates a demodulation reference signal bearing subframe for continuously scheduled subframes. In one embodiment, the periodicity and/or the offset indicates a demodulation reference signal bearing subframe for non-continuously scheduled subframes. In a further embodiment, the demodulation reference signal bearing subframe for non-continuously scheduled subframes is based on blank subframes being counted. In certain embodiments, the demodulation reference signal bearing subframe for non-continuously scheduled subframes is based on blank subframes not being counted. In various embodiments, the periodicity and/or the offset is indicated by radio resource control signaling. In some embodiments, the symbol level configuration includes one or more symbols in a subframe or slot. In one embodiment, the symbol level configuration is indicated by downlink control information signaling and/or radio resource control signaling.

In certain embodiments, the demodulation reference signal port mapping order includes a first mapping comprising frequency division multiplexing, a second mapping comprising frequency division orthogonal cover codes, and a third mapping comprising time division orthogonal cover codes, and wherein the first mapping, the second mapping, and the third mapping are performed in any suitable order. In various embodiments, the demodulation reference signal port mapping order includes a first mapping comprising frequency division multiplexing, a second mapping comprising frequency division orthogonal cover codes, and a third mapping comprising time division multiplexing, and wherein the first mapping, the second mapping, and the third mapping are performed in any suitable order. In some embodiments, the demodulation reference signal port mapping order includes a first mapping comprising cyclic shift, a second mapping comprising comb, and a third mapping comprising time division orthogonal cover codes, and wherein the first mapping, the second mapping, and the third mapping are performed in any suitable order. In one embodiment, the demodulation reference signal port mapping order includes a first mapping comprising cyclic shift, a second mapping comprising comb, and a third mapping comprising time division multiplexing, and wherein the first mapping, the second mapping, and the third mapping are performed in any suitable order.

In certain embodiments, the demodulation reference signal sharing between the physical downlink shared channel and the physical downlink control channel is indicated by radio resource control signaling and/or downlink control signaling. In some embodiments, the demodulation reference signal configuration is per a bandwidth part.

Figure 6:
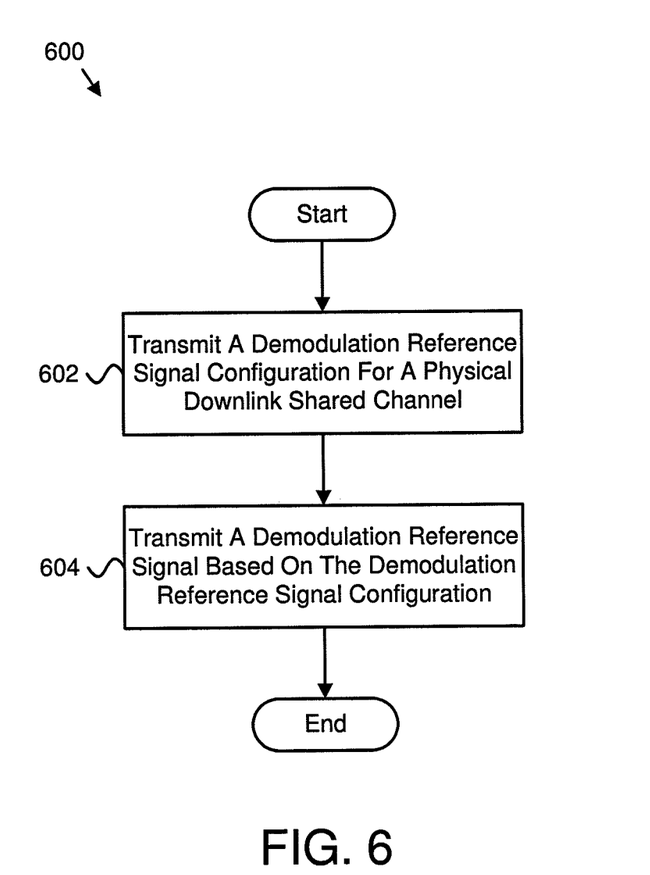
FIG. 6 is a schematic flow chart diagram illustrating another embodiment of a method for demodulation reference signal configuration.

FIG. 6 is a schematic flow chart diagram illustrating another embodiment of a method 600 for demodulation reference signal configuration. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a demodulation reference signal configuration for a physical downlink shared channel. The method 600, in certain embodiments, includes transmitting 604 a demodulation reference signal based on the demodulation reference signal configuration.

In one embodiment, the demodulation reference signal configuration includes a separate configuration for the physical downlink shared channel and the separate configuration is different from that of a physical downlink control channel. In a further embodiment, the demodulation reference signal configuration is shared between the physical downlink shared channel and a physical downlink control channel. In certain embodiments, the demodulation reference signal configuration includes a frequency domain configuration, a time domain configuration, and/or a demodulation reference signal port mapping order. In various embodiments, the frequency domain configuration includes a periodicity, and/or an offset. In some embodiments, the periodicity and/or the offset corresponds to a physical resource block. In one embodiment, the periodicity and/or the offset is indicated by radio resource control signaling. In a further embodiment, the time domain configuration includes a subframe level configuration, and/or a symbol level configuration. In certain embodiments, the subframe level configuration includes a periodicity and/or an offset.

In various embodiments, the periodicity indicates whether a demodulation reference signal is present in a single subframe. In some embodiments, the periodicity and/or the offset indicates a demodulation reference signal bearing subframe for continuously scheduled subframes. In one embodiment, the periodicity and/or the offset indicates a demodulation reference signal bearing subframe for non-continuously scheduled subframes. In a further embodiment, the demodulation reference signal bearing subframe for non-continuously scheduled subframes is based on blank subframes being counted. In certain embodiments, the demodulation reference signal bearing subframe for non-continuously scheduled subframes is based on blank subframes not being counted. In various embodiments, the periodicity and/or the offset is indicated by radio resource control signaling. In some embodiments, the symbol level configuration includes one or more symbols in a subframe or slot. In one embodiment, the symbol level configuration is indicated by downlink control information signaling and/or radio resource control signaling.

In certain embodiments, the demodulation reference signal port mapping order includes a first mapping comprising frequency division multiplexing, a second mapping comprising frequency division orthogonal cover codes, and a third mapping comprising time division orthogonal cover codes, and wherein the first mapping, the second mapping, and the third mapping are performed in any suitable order. In various embodiments, the demodulation reference signal port mapping order includes a first mapping comprising frequency division multiplexing, a second mapping comprising frequency division orthogonal cover codes, and a third mapping comprising time division multiplexing, and wherein the first mapping, the second mapping, and the third mapping are performed in any suitable order. In some embodiments, the demodulation reference signal port mapping order includes a first mapping comprising cyclic shift, a second mapping comprising comb, and a third mapping comprising time division orthogonal cover codes, and wherein the first mapping, the second mapping, and the third mapping are performed in any suitable order. In one embodiment, the demodulation reference signal port mapping order includes a first mapping comprising cyclic shift, a second mapping comprising comb, and a third mapping comprising time division multiplexing, and wherein the first mapping, the second mapping, and the third mapping are performed in any suitable order.

In certain embodiments, the demodulation reference signal sharing between the physical downlink shared channel and the physical downlink control channel is indicated by radio resource control signaling and/or downlink control signaling. In some embodiments, the demodulation reference signal configuration is per a bandwidth part.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, the apparatus further comprising:
   a receiver that receives a demodulation reference signal configuration for a physical downlink shared channel, wherein the demodulation reference signal configuration comprises a frequency domain configuration, a time domain configuration, and a mapping order for mapping demodulation reference signals to resource elements, and wherein:
      the mapping order comprises a first mapping and a second mapping;
      the first mapping and the second mapping are performed in any suitable order;
         the first mapping comprises a mapping between the demodulation reference signals and time domain resources, frequency domain resource, code domain resources, or a combination thereof based on at least one multiplexing scheme selected from a group consisting of:
            time division multiplexing (TDM), frequency division multiplexing (FDM), time division orthogonal cover code (TD-OCC), frequency division orthogonal cover code (FD-OCC), cyclic shift, and comb;
         the second mapping comprises a mapping between the demodulation reference signals and time domain resources, frequency domain resource, code domain resources, or a combination thereof based on at least one multiplexing scheme selected from the group; and
         the first mapping is different from the second mapping; and
   a processor that configures the user equipment based on the demodulation reference signal configuration;
   wherein the receiver receives a demodulation reference signal based on the demodulation reference signal configuration.

2. The apparatus of claim 1, wherein the demodulation reference signal configuration comprises configuring the demodulation reference signals for the physical downlink shared channel and a physical downlink control channel.

3. The apparatus of claim 2, wherein the demodulation reference signals for the physical downlink shared channel and the physical downlink control channel are shared, and the demodulation reference signals for the physical downlink control channel are used for demodulation of the physical downlink shared channel.

4. The apparatus of claim 3, wherein the demodulation reference signal sharing between the physical downlink shared channel and the physical downlink control channel is indicated by radio resource control signaling, downlink control signaling, or some combination thereof.

5. The apparatus of claim 1, wherein the frequency domain configuration comprises a periodicity, an offset, or some combination thereof.

6. The apparatus of claim 1, wherein the time domain configuration comprises a subframe level configuration, a symbol level configuration, or some combination thereof and the subframe level configuration comprises a periodicity, an offset, or a combination thereof.

7. The apparatus of claim 6, wherein the periodicity indicates whether a demodulation reference signal is present in a single subframe.

8. The apparatus of claim 6, wherein the periodicity, the offset, or some combination thereof indicates a demodulation reference signal bearing subframe for continuously scheduled subframes.

9. The apparatus of claim 6, wherein the periodicity, the offset, or some combination thereof indicates a demodulation reference signal bearing subframe for non-continuously scheduled subframes.

10. The apparatus of claim 9, wherein the demodulation reference signal bearing subframe for non-continuously scheduled subframes is based on blank subframes being counted.

11. The apparatus of claim 9, wherein the demodulation reference signal bearing subframe for non-continuously scheduled subframes is based on blank subframes not being counted.

12. The apparatus of claim 6, wherein the symbol level configuration comprises one or more symbols in a subframe or slot.

13. The apparatus of claim 12, wherein the symbol level configuration is indicated by downlink control information signaling, radio resource control signaling, or some combination thereof.

14. The apparatus of claim 1, wherein the mapping order comprises the first mapping comprising frequency division multiplexing, the second mapping comprising frequency division orthogonal cover codes, and a third mapping comprising time division orthogonal cover codes, and wherein the first mapping, the second mapping, and the third mapping are performed in any suitable order.

15. The apparatus of claim 1, wherein the mapping order comprises a first mapping comprising frequency division multiplexing, a second mapping comprising frequency division orthogonal cover codes, and a third mapping comprising time division multiplexing.

16. The apparatus of claim 1, wherein the mapping order comprises a first mapping comprising cyclic shift, a second mapping comprising comb, and a third mapping comprising time division orthogonal cover codes.

17. The apparatus of claim 1, wherein the mapping order comprises a first mapping comprising cyclic shift, a second mapping comprising comb, and a third mapping comprising time division multiplexing.

18. A method comprising:
   receiving, at a user equipment, a demodulation reference signal configuration for a physical downlink shared channel, wherein the demodulation reference signal configuration comprises a frequency domain configuration, a time domain configuration, and a mapping order for mapping demodulation reference signals to resource elements, and wherein:

the mapping order comprises a first mapping and a second mapping;

the first mapping and the second mapping are performed in any suitable order;

the first mapping comprises a mapping between the demodulation reference signals and time domain resources, frequency domain resource, code domain resources, or a combination thereof based on at least one multiplexing scheme selected from a group consisting of:

time division multiplexing (TDM), frequency division multiplexing (FDM), time division orthogonal cover code (TD-OCC), frequency division orthogonal cover code (FD-OCC), cyclic shift, and comb;

the second mapping comprises a mapping between the demodulation reference signals and time domain resources, frequency domain resource, code domain resources, or a combination thereof based on at least one multiplexing scheme selected from the group; and the first mapping is different from the second mapping;

configuring the user equipment based on the demodulation reference signal configuration; and receiving a demodulation reference signal based on the demodulation reference signal configuration.

19. An apparatus comprising a network device the apparatus further comprising:

a processor that determines a demodulation reference signal configuration for a physical downlink shared channel; and a transmitter that:

transmits the demodulation reference signal configuration, wherein the demodulation reference signal configuration comprises a frequency domain configuration, a time domain configuration, and a mapping order for mapping demodulation reference signals to resource elements, and wherein:

the mapping order comprises a first mapping and a second mapping;

the first mapping and the second mapping are performed in any suitable order;

the first mapping comprises a mapping between the demodulation reference signals and time domain resources, frequency domain resource, code domain resources, or a combination thereof based on at least one multiplexing scheme selected from a group consisting of:

time division multiplexing (TDM), frequency division multiplexing (FDM), time division orthogonal cover code (TD-OCC), frequency division orthogonal cover code (FD-OCC), cyclic shift, and comb;

the second mapping comprises a mapping between the demodulation reference signals and time domain resources, frequency domain resource, code domain resources, or a combination thereof based on at least one multiplexing scheme selected from the group; and the first mapping is different from the second mapping; and transmits a demodulation reference signal based on the demodulation reference signal configuration.

20. A method comprising:

determining a demodulation reference signal configuration for a physical downlink shared channel;

transmitting a demodulation reference signal configuration for a physical downlink shared channel, wherein the demodulation reference signal configuration comprises a frequency domain configuration, a time domain configuration, and a mapping order for mapping demodulation reference signals to resource elements, and wherein:

the mapping order comprises a first mapping and a second mapping;

the first mapping and the second mapping are performed in any suitable order;

the first mapping comprises a mapping between the demodulation reference signals and time domain resources, frequency domain resource, code domain resources, or a combination thereof based on at least one multiplexing scheme selected from a group consisting of:

time division multiplexing (TDM), frequency division multiplexing (FDM), time division orthogonal cover code (TD-OCC), frequency division orthogonal cover code (FD-OCC), cyclic shift, and comb;

the second mapping comprises a mapping between the demodulation reference signals and time domain resources, frequency domain resource, code domain resources, or a combination thereof based on at least one multiplexing scheme selected from the group; and the first mapping is different from the second mapping; and transmitting a demodulation reference signal based on the demodulation reference signal configuration.

* * * * *